Patented Apr. 7, 1953

2,634,264

UNITED STATES PATENT OFFICE 2,634,264

ANTIBIOTIC DERIVATIVES OF STREPTOMYCIN

Walter A. Winsten, Forest Hills, and Murray Katz, New York, N. Y., assignors to Schenley Industries, Inc., a corporation of Delaware No Drawing. Application August 6, 1947, Serial No. 766,882

2 Claims. (Cl. 260—210)

Our invention relates to antibiotic derivatives of streptomycin.

Streptomycin is a purified, active antibiotic principle produced by certain strains of *Streptomyces griseus* when they are grown on suitable media. It has the property of inhibiting the growth, and occasionally of destroying certain gram-positive and gram-negative bacteria. It can be regarded as being derived from three substances, streptidine, streptose, and N-methyl-1-glucosamine, linked together with elimination of two molecules of water. Streptidine, a natural guanidine derivative, has been identified as the meso form of 1,3-diguanido-2,4,5,6-tetrahydroxycyclohexane, and it is attached, possibly by a glucosidic linkage, to the disaccharide residue of the streptomycin molecule, streptobiosamine, which consists of streptose joined by another glucosidic linkage to the N-methyl-1-glucosamine. The streptose moiety is a sugar-like radical containing a carbonyl group as part of an aldehyde substituent.

According to our invention, we react streptomycin with a selected reagent which changes the carbonyl group to produce the corresponding oxime or hydrazone, particularly to a phenylhydrazone. Thus it is well known that oximes are formed by reacting carbonyl derivatives with hydroxylamine, $H_2N.OH$.

It is also well known that phenylhydrazones are formed by reacting carbonyl derivatives with typical reagents, such as phenylhydrazine,

$C_6H_5.NH.NH_2$

These oxime and phenylhydrazone derivatives of streptomycin have little or no antibiotic activity.

According to our invention, we reduce these inactive oxime and phenylhydrazone derivatives, as for example, by hydrogenation with the use of suitable catalysts.

We believe that by means of this reduction, we produce an amine derivative of streptomycin. This derivative has antibiotic activity, as when tested against *Staphylococcus aureus*, 209 P, and numerous other gram-positive and gram-negative micro-organisms.

We can use palladium black, platinum black and Raney nickel as catalysts, when said oxime or phenylhydrazone derivative is reduced by means of hydrogen.

Raney nickel is described in "Journal of American Chemical Society," (1943), vol. 64, page 1013; (1944), vol. 66, page 909; vol. 68, (1946), pages 724 and 1455.

Our invention is further disclosed in the following description and illustrative examples. Our invention is not limited to the details of the examples.

Example No. 1

200 milligrams of streptomycin, having a purity of 760 units per milligram, and 46.9 milligrams of hydroxylamine hydrochloride, $NH_2.OH.HCl$, are dissolved in 20 cubic centimeters of water. This is done at room temperature of 20° C.–25° C. The pH is adjusted to 8.0, which is only slightly above the neutral point, by means of sodium hydroxide, such as a normal aqueous solution of sodium hydroxide.

The solution is allowed to stand at 37.5° C. for 6 hours.

The resultant oxime derivative of the streptomycin has only about 1% of the original antibiotic activity of the original streptomycin.

The oxime derivative is reduced in said solution, in an atmosphere of hydrogen, at substantially neutral pH of about seven, using a suitable catalyst, such as palladium black. The pressure of the hydrogen during the reduction step is substantially 760 mm. of mercury. The weight of the palladium black catalyst is 1% of the weight of the solution.

This catalyst is mixed with the solution, and said solution is agitated or shaken while in contact with the hydrogen for four hours at 20° C.–25° C. Any suitable method can be used for vigorously intermixing the solution with the hydrogen.

The reduced oxime derivative is antibiotically active against *B. subtilis, B. mycoides, S. aureus*, 209 P, *E. coli, S. marcesens*, and it is not inactivated by cysteine, whereas streptomycin is inactivated by cysteine.

Instead of using water to dissolve the streptomycin, we can use methyl alcohol and other solvents for streptomycin.

Example No. 2

The streptomycin is treated in aqueous solution with phenylhydrazine, generally following the procedure of Example No. 1, to produce the inactive phenylhydrazone derivative of streptomycin. This inactive phenylhydrazone derivative is treated according to well-known reducing methods or with Raney nickel and hydrogen to produce an active antibiotic.

Example No. 3

This illustrates the advantage of using Raney nickel as a catalyst. This is less readily poisoned by excess hydroxylamine than platinum and palladium catalysts, such as platinum black or palladium black.

827 milligrams of streptomycin, which assay 610 micrograms per milligram as free streptomycin base, and having a total of 504,531 units, are dissolved in 10 cubic centimeters of water, in which 90.4 milligrams of hydroxylamine hydrochloride are also dissolved. The pH is adjusted to 7.5 by an aqueous solution of sodium hydroxide.

The solution is kept for 6 hours at 37.5° C.

3 cubic centimeters of acetone are then added to this solution and the mixture is allowed to stand for 3 hours at 37.5° C. and at a pH of 7.1. The solution is then diluted with water to a total volume of 27 cubic centimeters at about 20° C.–25° C. The solution is then extracted with ethyl ether in order to remove excess acetone and acetone oxime.

The solution is then concentrated at less than 50° C. and under a pressure of 17 millimeters of mercury, to a volume of about 25 cubic centimeters. This concentration step removes residual ethyl ether and acetone. The resultant oxime derivative has extremely low antibiotic activity, which is not greater than 2% of the antibiotic activity of the original streptomycin preparation.

Raney nickel catalyst, prepared from a nickel aluminum alloy, is used as the catalyst. The weight of the Raney nickel catalyst is 0.5 gram. The Raney nickel catalyst is stirred into the mixture, and the hydrogenation is conducted with shaking or agitation in an atmosphere of hydrogen at a pressure of 760 millimeters of mercury and at room temperature of 20° C.–25° C. When no more hydrogen is adsorbed, the hydrogenation is stopped. The resultant derivative has about 31% of the activity of the original streptomycin, against *Staphlococcus aureus*.

*Example No. 4*

1.443 grams of streptomycin hydrochloride (526,732 units) and 248 mg. of phenylhydrazine hydrochloride were dissolved in 10 ml. of water. 10 ml. of 95% ethanol were added to hold the phenylhydrazine hydrochloride in solution. The pH was adjusted to 7.6 with alkali. The mixture was kept or incubated for 4 hours at 37.5° C. and assayed. 5.1% of the original activity was left.

In an attempt to remove the residual activity, more phenylhydrazine hydrochloride (248 mg.) was added. The pH was adjusted to 7.7 and the solution was kept for 2 hours at 37.5° C.

15 ml. water were then added and the resulting solution extracted 3 times with 40 ml. portions of ether to remove excess phenylhydrazine hydrochloride. The material, after vacuum evaporation, still contained 3.9% of original activity in a total volume of 37 ml.

This product (the phenylhydrazone of streptomycin) in solution, was then subjected to reduction with hydrogen and Raney nickel. The reduction was carried out in three successive steps at room temperature of 20° C.–25° C. After 155 minutes, using 0.7 gram of catalyst, the total activity had not substantially increased over the residual 3.9% (20,424±1332 units going to 22,644±2220 units total). After 426 minutes, using 3.5 grams of catalyst, a sharp increase in the total assay was obtained, 133,822±13,290 units being recovered. The solution was exposed once again to 0.5 gram of catalyst for 430 minutes. A total activity of 146,400±20,800 units was recovered, namely, 27.8% calculated on the basis of the original amount of streptomycin used.

Generally speaking, it is desirable to avoid the use of hot alkaline media or hot acid media, as these destroy the parent streptomycin compound. The pressure of the hydrogen atmosphere may be considerably above 760 millimeters of mercury.

For example, we can reduce in a hydrogen atmosphere having a pressure of 150 atmospheres, and we can also use a temperature of 50° C. during the reduction. By using high pressure, or a temperature of 50° C., we can reduce the amount of Raney nickel which is required.

In general, excess hydroxylamine, or excess phenylhydrazine are removed before hydrogenation by adding acetone at neutral pH to the aqueous solution of the oxime or hydrazone derivative, to the extent of about 5%–10% of the volume of the solution, and incubating, followed by extraction of the acetone derivative.

Instead of using streptomycin itself as the starting material, we can use streptomycin derivatives which contain at least one carbonyl group, particularly an aldehydic carbonyl group CHO, and the use of such derivatives is included in the claims, when we refer to streptomycin.

We have described preferred embodiments of our invention, which include the improved method and the improved end-products, but numerous changes and omissions and additions can be made without departing from its scope.

We claim:

1. Process for producing antibiotic agents, which retain their antibiotic activity in the presence of cysteine and have the fundamental chemical structure of streptomycin except that the streptose carbonyl group is replaced by an aminomethylene group, that comprises treating a material chosen from the group consisting of streptomycin and its salts, with a compound chosen from the group consisting of hydroxyl amine and aryl hydrazines, whereby the oxygen atom of the carbonyl group is replaced with a substituted nitrogen atom connected by a double valence bond to the carbon atom; catalytically hydrogenating this substance to convert the said substituted nitrogen atom to an amino group by direct reaction with hydrogen, in the presence of a hydrogenation catalyst of the Raney-nickel type, while in a liquid solvent medium and at a hydrogen ion concentration of approximately pH 7.

2. An antibiotic agent, antagonistic to pathogenic micro-organisms, having antibiotic activity similar to that characteristic of streptomycin but differing therefrom in retaining its activity in the presence of cysteine, having the fundamental chemical structure represented by the formula:

$$\text{Strep—CH}_2\text{NH}_2$$

wherein Strep signifies the streptomycin molecule minus the streptose carbonyl group.

WALTER A. WINSTEN.
MURRAY KATZ.

REFERENCES CITED

The following references are of record in the file of this patent:

UNITED STATES PATENTS

| Number | Name | Date |
|---|---|---|
| 2,532,393 | Brink et al. | Dec. 5, 1950 |

OTHER REFERENCES

Degering, "An Outline of Organic Nitrogen Compounds," 1945 edition, pp. 192–193.

Brink et al., Science, vol. 102 (1945), pp. 506–507.

Donovick et al., J. Biol. Chem., vol. 164 (1946), pp. 173–181.